US008563073B1

(12) United States Patent
Luther et al.

(10) Patent No.: US 8,563,073 B1
(45) Date of Patent: Oct. 22, 2013

(54) METHODS FOR MAKING FRUIT OR VEGETABLE EXTRACT FROM BY-PRODUCTS

(75) Inventors: David Luther, West Richland, WA (US); Bruce DeJong, Richland, WA (US); Eric Johnson, Richland, WA (US)

(73) Assignee: Miline Fruit Products Inc, Prosser, WA (US)

( * ) Notice: Subject to any disclaimer, the term of this patent is extended or adjusted under 35 U.S.C. 154(b) by 654 days.

(21) Appl. No.: 12/128,462

(22) Filed: May 28, 2008

(51) Int. Cl.
*A23L 2/02* (2006.01)
*A23L 2/08* (2006.01)

(52) U.S. Cl.
USPC .......................... 426/655; 426/541; 426/425

(58) Field of Classification Search
CPC .................................... A23L 2/02; A23L 2/08
USPC .......................................... 426/655, 541, 425
See application file for complete search history.

(56) References Cited

U.S. PATENT DOCUMENTS

| 1,167,006 A | | 1/1916 | Monti | |
|---|---|---|---|---|
| 1,602,162 A | | 10/1926 | Monti | |
| RE18,542 E | * | 7/1932 | Miles et al. | 426/655 |
| 2,142,649 A | * | 1/1939 | Lindley | 241/89.3 |
| 3,236,655 A | * | 2/1966 | Murch et al. | 426/50 |
| 3,346,392 A | | 10/1967 | Lowe et al. | |
| 3,851,087 A | | 11/1974 | Nowlin | |
| 4,094,783 A | * | 6/1978 | Jackson | 210/703 |
| 4,253,390 A | * | 3/1981 | Hunt et al. | 100/45 |
| 4,452,822 A | | 6/1984 | Shrikhande | |
| 4,483,875 A | | 11/1984 | Dorreich | |
| 4,500,556 A | | 2/1985 | Langston | |
| 4,620,980 A | * | 11/1986 | Dumont | 426/422 |
| 4,643,088 A | * | 2/1987 | Kollmar | 100/37 |
| 4,775,477 A | | 10/1988 | Stahl et al. | |
| 4,794,013 A | | 12/1988 | Gresch | |
| 4,971,813 A | | 11/1990 | Strobel et al. | |
| 6,093,401 A | | 7/2000 | Shanbrom | |
| 6,231,866 B1 | | 5/2001 | Mann | |
| 6,251,463 B1 | | 6/2001 | Rossy et al. | |
| 6,391,345 B1 | | 5/2002 | Heeg et al. | |
| 6,440,467 B2 | | 8/2002 | Mann | |
| 6,479,081 B2 | | 11/2002 | Feries | |
| 6,544,581 B1 | * | 4/2003 | Shrikhande et al. | 426/655 |
| 6,733,798 B2 | | 5/2004 | Heeg et al. | |
| 2002/0168429 A1 | | 11/2002 | Mann | |
| 2002/0192314 A1 | | 12/2002 | Cho et al. | |
| 2003/0129279 A1 | * | 7/2003 | Coutel et al. | 426/51 |
| 2005/0037095 A1 | | 2/2005 | Bailey et al. | |
| 2005/0095332 A1 | | 5/2005 | Stanley | |
| 2005/0208189 A1 | | 9/2005 | Kurschner et al. | |
| 2006/0013723 A1 | | 1/2006 | Daeschel et al. | |
| 2007/0003644 A1 | * | 1/2007 | Randhava et al. | 424/766 |

OTHER PUBLICATIONS

Michigan State Horticultural Society, Annual Report, vol. 49-50, 1919-1920, pp. 36.*

(Continued)

*Primary Examiner* — Humera Sheikh
*Assistant Examiner* — Hong T Yoo
(74) *Attorney, Agent, or Firm* — Price Heneveld LLP (57) ABSTRACT

A process for making a fruit or vegetable extract including diffusing, screening, and pressing the pomace, and spinning, filtering and concentrating juice from the pomace to form an extract. Also, the pomace may be hydrated at various points during this process by water or by reclaimed condenser condensate. Also included is an extract made using the present inventive methods.

20 Claims, 5 Drawing Sheets

(56) References Cited

OTHER PUBLICATIONS

Paliyath, Gopinadhan; Dennis P. Murr; Avtar K. Handa; Susan Luire. Postharvest Biology and Technology of Fruits, Vegetables and Flowers, Wiley-Blackwell Publishing, 2008. pp. 270-272, 275 and 277.*

Heath, Henry B., Source Book of Flavors, Van Nostrand Reinhold, 1981, pp. 114.*

Naidu, A.S., Natural Food Antimicrobial System, CRC Press LLC, 2000, pp. 327-328.*

* cited by examiner

METHODS FOR MAKING FRUIT OR VEGETABLE EXTRACT FROM BY-PRODUCTS

BACKGROUND OF THE INVENTION

It is known to remove the juices from agricultural products by various methods, such as pressing. After removal of such juices, by-products or "pomace" from the agricultural product remains and often is discarded. Pomace is a mixture of fruit or vegetable remnants, e.g., the seeds, the stems, the skins and pulp. However, valuable nutritional components, such as polyphenols, remain in the pomace. Pomace may have "press-aid" mixed in, with the pomace. Press aid, often shredded paper, is added to the pomace so that during pressing the pomace has a surface to press against to aide in extraction of juice.

Various processes have been developed to extract juice and nutritional components from pomace. Such known processes include, for example, using alcohol or mixtures of alcohol and water as a solvent to extract compounds from the pomace. Another known process is counter-current extraction in which pomace is extracted by using a device to push the pomace against a current flow of water thereby extracting the valuable compounds by diffusion. However, such known methods require organic solvents and/or do not efficiently extract the valuable compounds from the pomace.

SUMMARY OF THE INVENTION

These and other features, advantages and objects of the present invention will be further understood and appreciated by those skilled in the art by reference to the following specification, claims and appended drawings.

The present invention generally relates to methods for extracting bioactive compounds (such as polyphenols) from pomace. More specifically, one embodiment of the present invention is a method for making a fruit or vegetable extract including the steps: providing a fruit or vegetable pomace; diffusing the pomace in an aqueous solution to form a hydrated pomace (which diffusing step may include heating and agitating the pomace); screening the hydrated pomace whereby a free-run juice and a screened pomace are separated from the hydrated pomace; pressing the screened pomace whereby a pressed juice and a primary pressed pomace are separated from the screened pomace; combining the free-run juice and the pressed juice into a combined pressed juice; spinning the combined pressed juice whereby a clarified juice and a sediment are separated from the combined pressed juice; filtering the clarified juice to form a filtered juice (which filtering step may include a primary and a secondary filtering); and concentrating the filtered juice to form an extract.

With the present method, the pressing step may include a primary pressing and a secondary pressing, wherein the pressed juice and primary pressed pomace are separated from the screened pomace during the primary pressing, and the method may further include hydrating the primary pressed pomace with the aqueous solution between the primary pressing and the secondary pressing to form a hydrated pressed pomace. Also, a re-washed juice and a waste pomace may be separated from the hydrated pressed pomace during the secondary pressing, and the re-washed juice may be added to the combined pressed juice. Further, the present method may include hydrating the sediment and combining the sediment with the hydrated pressed pomace.

With the present method, the spinning step may include decanting the combined pressed juice to form a decanted juice and may also include centrifuging the decanted juice. Further, ferrous materials may be removed from the filtered clarified juice.

Utilizing the present method, extract made by the method may have a brix of from about 20 to about 40 or, more specifically, the extract may have a brix of about 40. Additionally, the fruit or vegetable pomace may be cranberry pomace, blueberry pomace, grape pomace, blackberry pomace, and black currant pomace. More specifically, the pomace may be a berry pomace, such as blueberry pomace.

The present invention also includes an extract made according to any of the aforementioned methods. This extract may have a brix of from about 20 to about 40 or, more specifically, the extract may have a brix of about 40.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

FIGS. 1A-1E collectively depict a flow diagram of one embodiment of the entire extraction system 10.

DETAILED DESCRIPTION OF THE PREFERRED EMBODIMENTS

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1A:
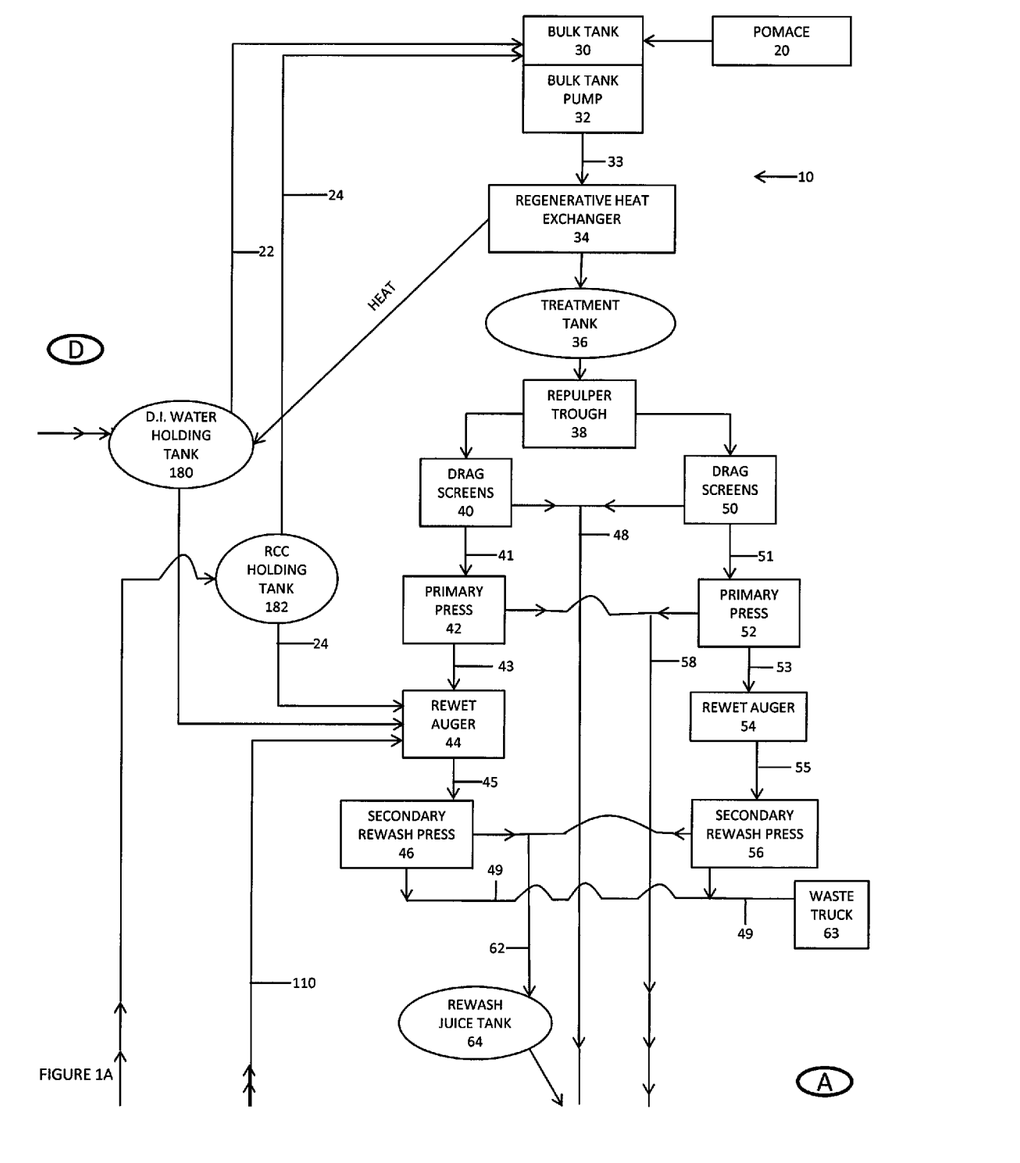

With the present method, the screening and pressing steps may include a first screening and pressing line and a second screening and pressing line (see FIG. 1A). Also, a reclaimed concentrator condensate may be formed from the concentrating step and the aqueous solution may include some of the reclaimed concentrator condensate (RCC).

Using the present inventive method, one can remove an extract from pomace that has excellent properties, such as superior color and high levels of polyphenols. Polyphenols are water-soluble plant pigments, also known as bioflavonoids, which encompass more than 4,000 chemically unique flavonoids. Subcategories of polyphenols, according to their chemical structure, include flavonols (such as quercetin from berries and onions), flavanones (such as naringin from oranges and grapefruit), anthocyanidins (such as cyaniding from various grapes), catechins (such as EGCG from green tea), and isoflavones (such as daidzein from soy and red clover). Table 1 shows properties of various extracts (in dried powder form) made using the present methods.

Table 1:

TABLE 1

| Type | Total Phenolics | Total Anthocyanins | ORAC | Proanthocyanins | Resveratrol |
|---|---|---|---|---|---|
| Blueberry | 5,200 | 1400 | 1100 | not applicable | not applicable |
| Cranberry | 5,800 | 560 | 1200 | 5100 (B1, B2, A1, and A2 forms) | not applicable |
| Concord | 6,700 | 840 | 2000 | 2316 (B1 and B2 forms) | 6 |
| Black Berry | 4,950 | 570 | 1100 | not applicable | not applicable |
| Black Currant | 5500 | 2100 | 1600 | not applicable | not applicable |

In Table 1, all values are in units of mg/100 g, except ORAC. ORAC values are shown in units of micromoles of Trolox equivalent per gram (Trolox is a synthetic vitamin E that is a standardized reference for ORAC measurement). Depending on the crop year, and other variables, a reasonable expected range of values for each of these measures is +/−20%. The ORAC values were tested by the Brunswick labs method, total phenolics values were tested by the Folins method, anthocyanins values were tested by the Wrolstad method, and all other values were tested by HPLC methods. Oxygen Radical Absorbance Capacity (ORAC) is a widely used testing method which measures the anti-oxidant activity or capability of a food ingredient. The higher the ORAC measurement, the better the anti-oxidant activity or capability of a food ingredient. Anti-oxidants include: Vitamins: C, E, and A (which is converted from beta-carotene), selenium (a mineral), phenolic compounds (such as ellagic acid in berries), carotenoids, and flavonoids (such as anthocyanins, anthocyanadins, and quercetin).

In one embodiment of the present method, a fruit or vegetable pomace is provided. For example, the fruit or vegetable pomace may be cranberry pomace, blueberry pomace, grape pomace, blackberry pomace, or black currant pomace. Examples of vegetable pomace that could be used with the present methods are tomato pomace, carrot pomace, beet pomace, and pomace from most root-type vegetables having a fair amount of fiber content.

Figure 1B:
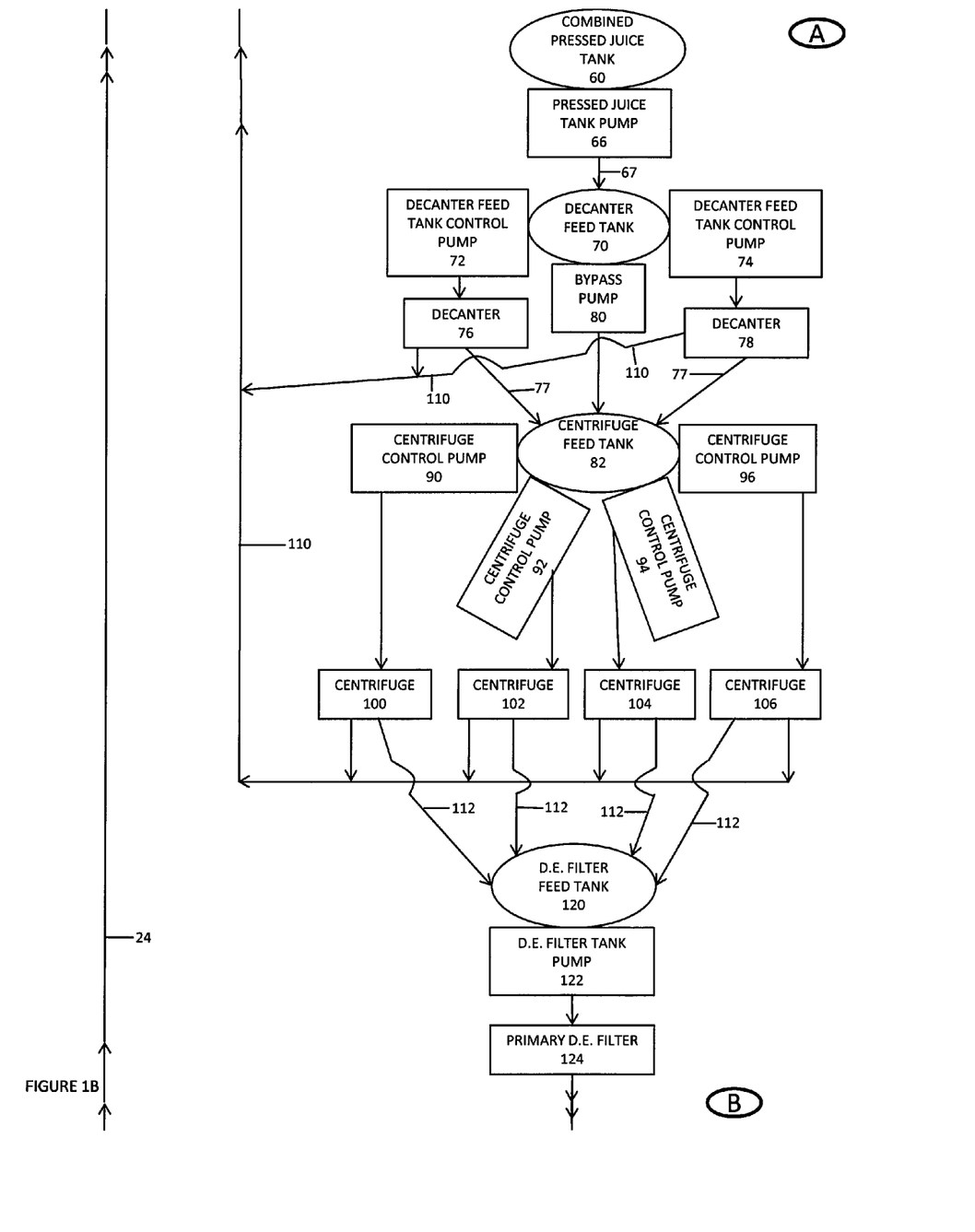
FIG. 1B is that portion of the entire flow chart located immediately below FIG. 1A.
Figure 1C:
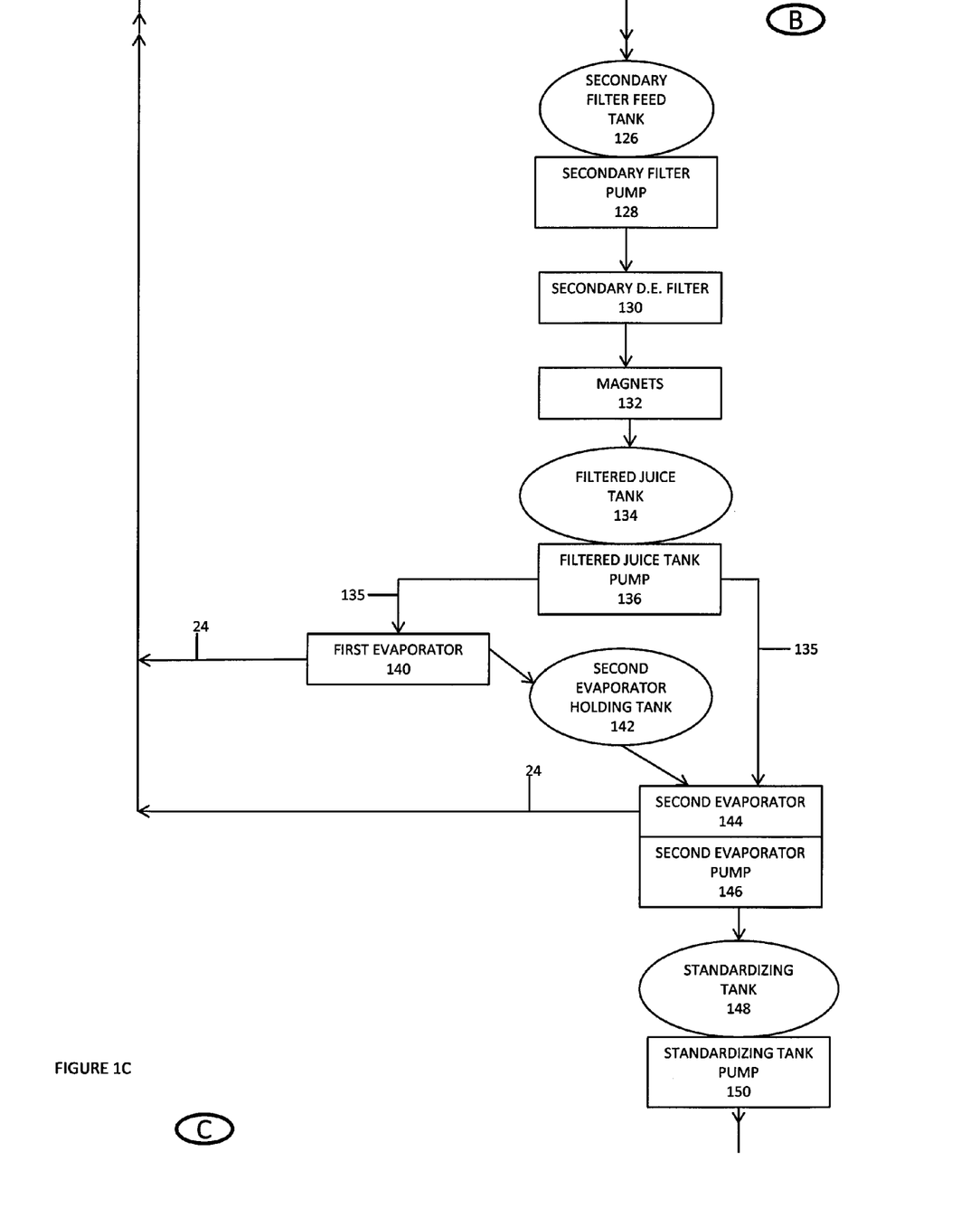
FIG. 1C is that portion of the entire flow chart located immediately below FIG. 1B.

With the present method, the pomace is diffused in an aqueous solution to form a hydrated pomace. For example, de-ionized water is combined with the pomace, and the pomace-water mixture is heated and agitated such that polyphenols and other nutrients are leeched or diffused out of the pomace into the aqueous solution. De-ionized water can be used with this process. In one embodiment, as depicted in FIG. 1E, unprocessed water 18 is flowed through backflow preventer 160, through sediment filter 162, through first carbon filter 164, through soft water system 166, through reverse osmosis system 168, through de-ionizing system 170, through second carbon filter 172, and into de-ionizing water holding tank 180. By removing the minerals, etc., in the process of preparing de-ionized water 22, the pH is lowered. Unprocessed water 18 may be municipal water. The pH of municipal water is at about a pH of 8.4. De-ionizing water 22 manufactured by the present process has a pH from about 3.0 to 5.0, which pH is valuable to obtain good color in the extract. For example, in the processing of cranberry extract with the present method, when water having a pH of about 8.0 is used the color of the extract is almost black. In contrast, when water having a pH of about 3.0 to about 5.0 is used, the color of the extract is bright red and therefore desirable.

Additionally, water recovered or reclaimed at other steps in the present process also has a pH of about 3.0 and, therefore can be utilized to mix with bulk pomace 20 at the beginning of the process or to rewet pomace at other points during the process (FIG. 1A). For example, reclaimed concentrator condensate 24 can be evaporated from filtered juice 135 during the process and used in this manner. As shown in FIG. 1C, filtered juice 135 is condensed in first evaporator 140 to a brix of 20 during this evaporation or concentration step, and reclaimed concentrator condensate 24 is evaporated from filtered juice 135 in first evaporator 140. Brix is a measurement by which the percentage by weight of soluble solids is expressed as the percent of sucrose in a solution. Soluble solids are material that is capable of being dissolved or mixed, i.e., the material will not precipitate out. Insoluble solids are material that is not liquid soluble, i.e., the material will not mix or go into solution and will precipitate from the solution over a period of time. Reclaimed concentrator condensate 24 is stored in reclaimed concentrator condensate holding tank 182 for use in mixing with de-ionized water 22 in an initial step of the process. Additionally, reclaimed concentrator condensate 24 is added to rewet primary pressed pomace 43 in rewet auger 44. (See FIG. 1A).

Through a combination of steps, the inventors have devised a method for efficiently removing extract from a fruit or vegetable pomace. The present process generally involves providing a fruit or vegetable pomace, diffusing the pomace in an aqueous solution to form a hydrated pomace, screening the hydrated pomace whereby a free-run juice and a screened pomace are separated from the hydrated pomace; pressing the screened pomace whereby a pressed juice and a primary pressed pomace are separated from the screened pomace; combining the free-run juice and the pressed juice into a combined pressed juice; spinning the combined pressed juice whereby a clarified juice and a sediment are separated from the combined pressed juice; filtering the clarified juice to form a filtered juice; and concentrating the filtered juice to form an extract. FIGS. 1A through 1E depict one embodiment of extraction system 10. In one embodiment, all of the tubes or lines carrying product in extraction system 10 are made from stainless steel. Typically, the stainless steel lines are three inch lines.

In one embodiment, pomace 20 is dumped into bulk tank 30. Pomace 20, and de-ionized water 22 and/or reclaimed concentrator condensate 24 are combined in bulk tank 30 to form hydrated pomace 33. Hydrated pomace 33 is pumped by bulk tank pump 32 through regenerative heat exchanger 34 for heating to a temperature from about 110 to about 130 degrees Fahrenheit. A target temperature is 120 degrees Fahrenheit. Hydrated pomace 33 is heated in regenerative heat exchanger 34 to the desired temperature in a matter of only a few minutes, i.e., two to three minutes, and then is moved to treatment tank 36 for a leach time, or diffusion time. The leach time or diffusion time can be about one hour to allow the nutrients to diffuse from the solid components of hydrated pomace 33 into the solution component of the hydrated pomace 33. Heat from regenerative heat exchanger 34 also can be used to heat de-ionized water 22 held in de-ionized water holding tank 180.

Regenerative heat exchanger 34 is a "tube-in-shell" regenerative heat exchanger. A tube-in-shell heat exchanger has a product tube in the middle (e.g. carrying hydrated pomace 33) and around that tube is a larger tube carrying steam to heat the product in the product tube. Heat is exchanged from the steam in the larger tube through the wall of the product tube to heat the product in the product tube of a tube-in-shell heat exchanger. In treatment tank 36, heated hydrated pomace 33 is agitated to facilitate the diffusion process. The agitation in treatment tank 36 keeps the hydrated pomace in suspension and doesn't allow it to settle out. In one embodiment treatment tank 36 is a stainless steel tank and bulk tank pump 32 is a moyno style barrel pump. Pomace 20 and de-ionized water 22 and/or reclaimed concentrator condensate 24 are mixed by the pumping action of bulk tank pump 32. De-ionized water 22 is used to hydrate pomace 20 in bulk tank 30 until such time as reclaimed concentrator condensate 24 is available for use in bulk tank 30. In one embodiment, the process is running for six hours before reclaimed concentrator condensate 24 is available for use in hydrating either pomace 20 or for use in rewet auger 44. Reclaimed concentrator condensate 24 comes back from first evaporator 140 at a temperature of about 120 to 150 degrees Fahrenheit. As such, if reclaimed concentrator condensate 24 is mixed with pomace 20, it may be necessary to add only a very small amount of heat at regenerative heat exchanger 34.

Hydrated pomace 33 in treatment tank 36 is a liquid slurry with about 20% of the weight from pomace 20 and 80% of the weight from de-ionized water 22 and/or reclaimed concentrator condensate 24. Prior to the screening step, hydrated pomace 33 is moved from treatment tank 36 through repulper trough 38 and into drag screens 40 and/or drag screens 50. Repulper trough 38 is a tank including an auger where press aid can be added. However, if press aid already is present in pomace 20, little or no press aid needs to be added in repulper trough 38.

After diffusing pomace 20 in an aqueous solution to form hydrated pomace 33, hydrated pomace 33 is screened and pressed to remove juice that contains valuable nutrients. The screening and pressing steps can include duplicate lines, i.e., a first screening and pressing line, and a second screening and pressing line to process hydrated pomace 33. This is a through-put mechanism with each line serving the same purpose. This dual screening and pressing process is a redundant process so that if one line malfunctions, the other line is still available. In one embodiment, both lines are used. Space permitting, more than two lines could be set-up and utilized.

Referring to FIG. 1A, hydrated pomace 33 is pumped up from treatment tank 36 to drag screen 40; drag screen 40 is horizontal and flat, with a perforated screen (e.g. a screen having 1/16 inch holes); hydrated pulp 33 is dragged across drag screen 40 with a series of brushes to liberate free-run juice 48 through the screen; and screened pomace 41 is dragged off and dumped into primary press 42 by gravity. The brushes drag hydrated pomace 33 along, keeping the screen holes clean and separating free-run juice 48 from hydrate pomace 33. Free-run juice 48 moves by gravity to combined pressed juice tank 60.

Approximately 85% of combined pressed juice 67 in combined pressed juice tank 60 is free-run juice 48. As described below, combined pressed juice tank 60 also includes pressed juice 58 and rewashed juice 62 which are extracted during primary and secondary pressing steps respectively. Pressed juice 58 makes up about 15% of combined pressed juice 67 in combined pressed juice tank 60, and rewashed juice 62 makes up about 5% of combined pressed juice 67 in combined pressed juice tank 60.

Gravity may be utilized throughout the screening and pressing steps to facilitate movement of: screened pomace 41 from drag screens 40 to primary press 42, primary pressed pomace 43 to rewet auger 44, hydrated pressed pomace 45 to secondary rewash press 46, rewashed juice 62 to rewash juice tank 64, and free-run juice 48 and pressed juice 58 to combined pressed juice tank 60 (FIG. 1A). That is, drag screens 40 are on a (top) third deck, primary press 42 is on a second deck, and secondary rewash press 46 is on a first deck. Thus, no pumping action is required to move the pomace through the screening and pressing operations. For some color-sensitive fruits or vegetables, the use of pumps aerates the pomace causing a degradation in color. Accordingly, the use of gravity preserves the color of the fruits and vegetables.

After free-run juice 48 is liberated from hydrated pomace 33, screened pomace 41 moves from drag screen 40 through gravity to primary press 42. Primary press 42 may be a screw press such as a Rietz press. At primary screw press 42, screened pomace 41 is a liquidy mash that is squeezed by primary press 42 to remove pressed juice 58. Pressed juice 58 travels by gravity to combined pressed juice tank 60 where it is combined with free-run juice 48. Pressed primary pomace 43 drops from drag screen 40 to primary press 42.

After pressed juice 58 is removed from screened pomace 41 at primary press 42, primary pressed pomace 43 drops by gravity into rewet auger 44. In rewet auger 44, de-ionized water 22 and/or reclaimed concentrator condensate 24 is added to primary pressed pomace 43 to rewet this pomace. Rewet auger 44 helps to fluff primary pressed pomace 43 and mix it with de-ionized water 22 and/or reclaimed concentrator condensate 24. Once rewetted and mixed, hydrated pressed pomace 45 drops by gravity into secondary rewash press 46. Secondary rewash press 46 also may be a screw press such as a Rietz press. The pressing action of secondary rewash press 46 liberates rewashed juice 62 from the hydrated pressed pomace 45, and the rewashed juice 62 moves by gravity to rewash juice tank 64. Rewashed juice 62 is moved from rewashed juice tank 64 by a pump to combined pressed juice tank 60 where rewashed juice 62 is combined with free-run juice 48 and pressed juice 58.

At the point where hydrated pressed pomace 45 has reached secondary rewash press 46, much of the nutritional content has been removed from the pomace. Thus, after rewashed juice 62 is removed from hydrated pressed pomace 45 in secondary rewash press 46, waste pomace 49 remaining from the processing in secondary rewash press 46 has little nutritional content. Therefore, waste pomace 49 is transferred for disposal by waste truck 63. Rewash juice tank 64 provides versatility, allowing segregation of rewashed juice 62, if desired.

Between regenerative heat exchanger 34 (FIG. 1A) and the concentration step (i.e. first evaporator 140, FIG. 1C), the temperature of the pomace does not drop significantly. For example, the temperature may drop five degrees between regenerative heat exchanger 34 and first evaporator 140.

As indicated above, two lines of screening and pressing may be used. As shown in FIG. 1A, drag screen 50, primary press 52, rewet auger 54, and secondary rewash press 56 perform the same functions in the same order as drag screen 40, primary press 42, rewet auger 44, and secondary rewash press 46; creating free-run juice 48, pressed juice 58, and rewashed juice 62 as previously described.

Combined pressed juice 67 is pumped by pressed juice tank pump 66 to decanter feed tank 70. Pressed juice tank pump 66, in one embodiment, is a centrifugal pump. Decanter feed tank 70 acts as a holding tank to allow for standardization of flow into decanter 76 and decanter 78. In one embodiment decanters 76 and 78 are each Westfalia 365 decanters. Decanter feed tank control pump 72 and decanter feed tank control pump 74 pump combined pressed juice 67 from decanter feed tank 70 into decanter 76 and decanter 78, respectively. Each of decanter feed tank control pumps 72 and 74 has a variable control, as compared to pressed juice tank pump 66 which is always on. Pumps 66, 72, and 74 are all centrifugal pumps, however, pressed juice tank pump 66 is larger than decanter feed tank control pumps 72 and 74. An operator can adjust the variable control of decanter feed tank control pump 72 and 74, depending on quality parameters of the combined pressed juice 67.

Additionally, in the event decanter feed tank 70 fills up, bypass pump 80 is available to bypass decanters 76 and 78 such that combined pressed juice 67 flows directly into centrifuge feed tank 82. Bypass pump 82 also can be used if one or both of decanter feed tank control pumps 72 and 74 are not working. This by-pass mechanism allows the flow to be continuous. Use of this by-pass mechanism may result in a blip in quality of the juice, however, because bypass pump 80 is intended for use only for limited periods of time (e.g. five to ten minutes), the temporary absence of the decanting step has an insignificant effect when the un-decanted product is blended in with juice processed over a long period of time (e.g., a twenty-four hour run).

By mechanical spinning, decanters 76 and 78 separate sediment 110 from combined pressed juice 67. Decanters, such as those disclosed, will reduce 15% sediment in combined pressed juice 67 down to 5% sediment for further processing in the centrifuging step. More specifically, decanted juice 77 (and any combined pressed juice 67 run through bypass pump 80) is held in centrifuge feed tank 82 (FIG. 1B). Decanted juice 77 (and any combined pressed juice 67) in centrifuge feed tank 82 are pumped by centrifuge control pumps 90, 92, 94, and 96 for centrifuging in centrifuges 100, 102, 104, and 106, respectively. High solids such as seed pieces, seed wholes, press-aid and fiber are spun from combined pressed juice 67 in decanter 76 and 78. In contrast, because centrifuges 100, 102, 104, and 106 operate at a higher g-force, these centrifuges spin fine solids from decanted juice 77 (and any combined pressed juice 67, if the bypass pump 80 is operating). In decanters 76 and 78 and in centrifuges 100, 102, 104, and 106, sediment 110 is separated from combined pressed juice 67 and decanted juice 77, respectively. Sediment 110 is pumped upstream to rewet auger 44 (and/or rewet auger 54). In rewet auger 44 (and/or rewet auger 54), sediment 110 is hydrated with an aqueous solution (de-ionized water 22 and/or reclaimed concentrator condensate 24) and combined with primary pressed pomace 43. In rewet auger 44 (and/or rewet auger 54), sediment 110 will bind with press-aid and about 90% of sediment 110 will be removed in waste pomace 49. Waste pomace 49 is carried by waste truck 63 for application back to the land.

Centrifuge control pumps 90, 92, 94, and 96 are used to control the flow of decanted juice 77 to centrifuges 100, 102, 104, and 106, respectively. Centrifuges 100, 102, 104, and 106 may be Westfalia SC35 centrifuges, however, other centrifuges could be used in this method. In addition to the control afforded by centrifuge control pumps 90, 92, 94, and 96, centrifuges 100, 102, 104, and 106 are controlled by how often the disc stacks in the centrifuges (not shown) are washed and rinsed. Centrifuges 100, 102, 104, and 106 run on different cycles and, accordingly, can be cleaned at different times. For example, the centrifuges can be cleaned with a full de-sludge, where there is no decanted juice 77 going through the centrifuge and water is used to rinse off the disc stacks of the centrifuge. Alternatively, the centrifuge can be cleaned with a partial de-sludge such that decanted juice 77 continues to run through the centrifuge but the disc stacks also is simultaneously being partially rinsed with water. Thus, centrifuges 100, 102, 104, and 106 are controlled by how often the disc stacks inside the centrifuges are cleaned and whether the cleaning is a full clean or a partial clean. Such controls are implemented to meet requirements for the amount of sediment 110 resulting from operation of the centrifuge. For example, a target amount of sediment is a trace amount of sediment or 0.1% sediment.

By their operation, centrifuges 100, 102, 104, and 106 produce clarified juice 112 which is used in the filtering step. Clarified juice 112 is moved from centrifuges 100, 102, 104, and 106 to diatomaceous earth filter feed tank 120 for holding and feeding of clarified juice 112 through the filtering step. Clarified juice 112 still has some sediment in it and, therefore, is cloudy. In diatomaceous earth filter feed tank 120, clarified juice 112 is blended, by agitation, with diatomaceous earth. The blend of clarified juice 112 and diatomaceous earth is pumped by diatomaceous earth filter tank pump 122 (a centrifugal pump) to primary diatomaceous earth filter 124. A series of diatomaceous earth filter tank pumps may be utilized, depending upon which filters are operating. As shown in FIG. 1C, clarified juice that has passed through primary diatomaceous earth filter 124 is moved to secondary filter feed tank 126 which, in turn pumps clarified juice 112 via secondary filter pump 128 into secondary diatomaceous earth filter 130. Secondary filter feed tank 126 provides variability control during filtering. For example, if one filter is concluding its run time, there can be a little buffer of time for the next filter to draw down.

Primary diatomaceous earth filter 124 and secondary diatomaceous earth filter 130 are pressure leaf filters. The filters can be used in any order and generally perform the same functions. However, a different mix of diatomaceous earth grades may be used in each filter. Diatomaceous earth is graded for size, e.g., if a very fine sized diatomaceous earth is used, clarified juice 112 will be highly refined to less than 200 nephelometric turbidity units (ntu's) with a 0% sediment (or a trace of sediment). Depending upon the pomace 20, an operator can select different blend ratios of diatomaceous earth, such as, FW60, FW12, and FW6. In one embodiment, Eagle Pitcher brand diatomaceous earth is used in the filtering process. The operator of the system 10 can blend any grade of diatomaceous earth to obtain the desired finish product specification. For example, one desired finished product specification is less than 200 ntu's with a 0% sediment.

Filtered juice 135 is under enough pressure from secondary filter pump 128 so that filtered juice 135 is pushed from secondary diatomaceous earth filter 130 to filtered juice tank 134. Each of the filters in primary diatomaceous earth filter 124 and secondary diatomaceous filter 130 are pressure filters so they are under pressure of up to about 60 pounds per square inch. Magnets 132 (e.g. 3 magnets) are used between secondary diatomaceous earth filter 130 and filtered juice tank 134 for the purpose of removing ferrous particles from filtered juice 135. Filtered juice tank 134 is used as a buffer to build volume or take volume down, but not necessarily to control operations for another piece of equipment. From filtered juice tank 134, filtered juice 135 is pumped by filtered juice tank pump 136 for concentration in first evaporator 140. Evaporators or other equipment can be used as a concentrator to remove water from filtered juice 135. In one embodiment, a Weigand evaporator is used. Filtered juice tank pump 136 is a centrifugal pump. Filtered juice 135 is moved from first evaporator 140 to second evaporator holding tank 142 which feeds second evaporator 144. First evaporator 140 is used to build brix in filtered juice 135. In one embodiment, filtered juice 135 in first evaporator 140 is concentrated to a brix of 20 (20% solids). Second evaporator 144 is an APV evaporator (Aluminum Plant and Vessel) which is used to bring filtered juice 135 to a final brix. In one embodiment, the final brix is 40. As a result of this concentrating step, reclaimed concentrator condensate 24 is evaporated from first evaporator 140 and second evaporator 144. As noted above, reclaimed concentrator condensate 24 is transferred to RCC holding tank 182 for use in hydrating pomace 20 or for rewetting primary pressed pomace 43 or sediment 110 in rewet auger 44. Additionally, if system 10 is operating such that more low brix filtered juice is being produced than can be processed by first evaporator 140, then filtered juice 135 is pumped directly to second evaporator 144 (FIG. 1C).

Filtered juice 135 that has reached the appropriate brix in second evaporator 144 is pumped with second evaporator pump 146 (a positive displacement pump) to standardizing tank 148. In the event the brix of the filtered juice coming from second evaporator 144 is too high, water is added to that juice in standardizing tank 148. For example, if the specification calls for a brix of 40, and the juice coming from second evaporator 144 has a brix of 42, water is added to the juice to bring it down to a brix of 40.

Figure 1D:
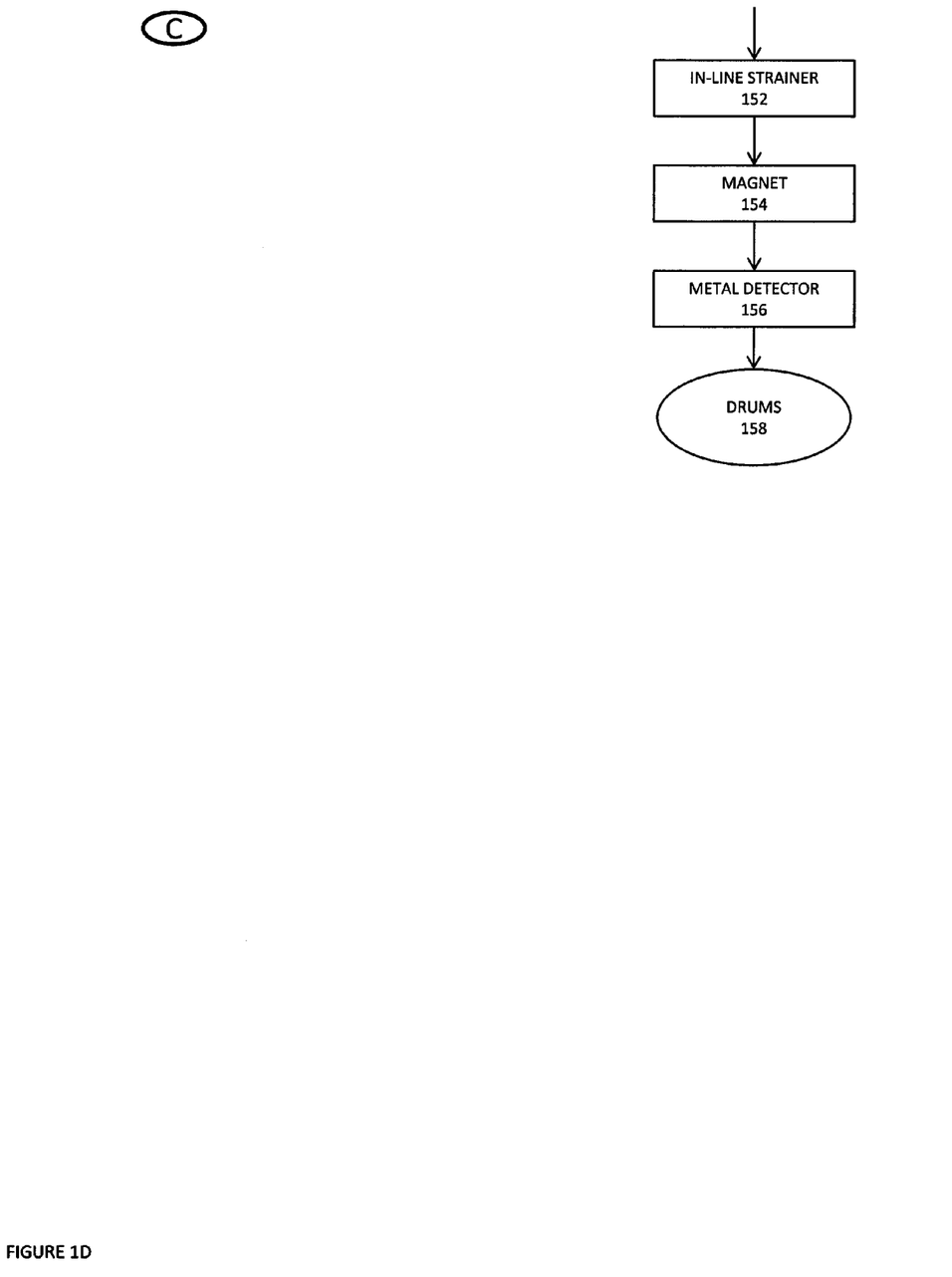
FIG. 1D is that portion of the entire flow chart located immediately below FIG. 1C.
Figure 1E:
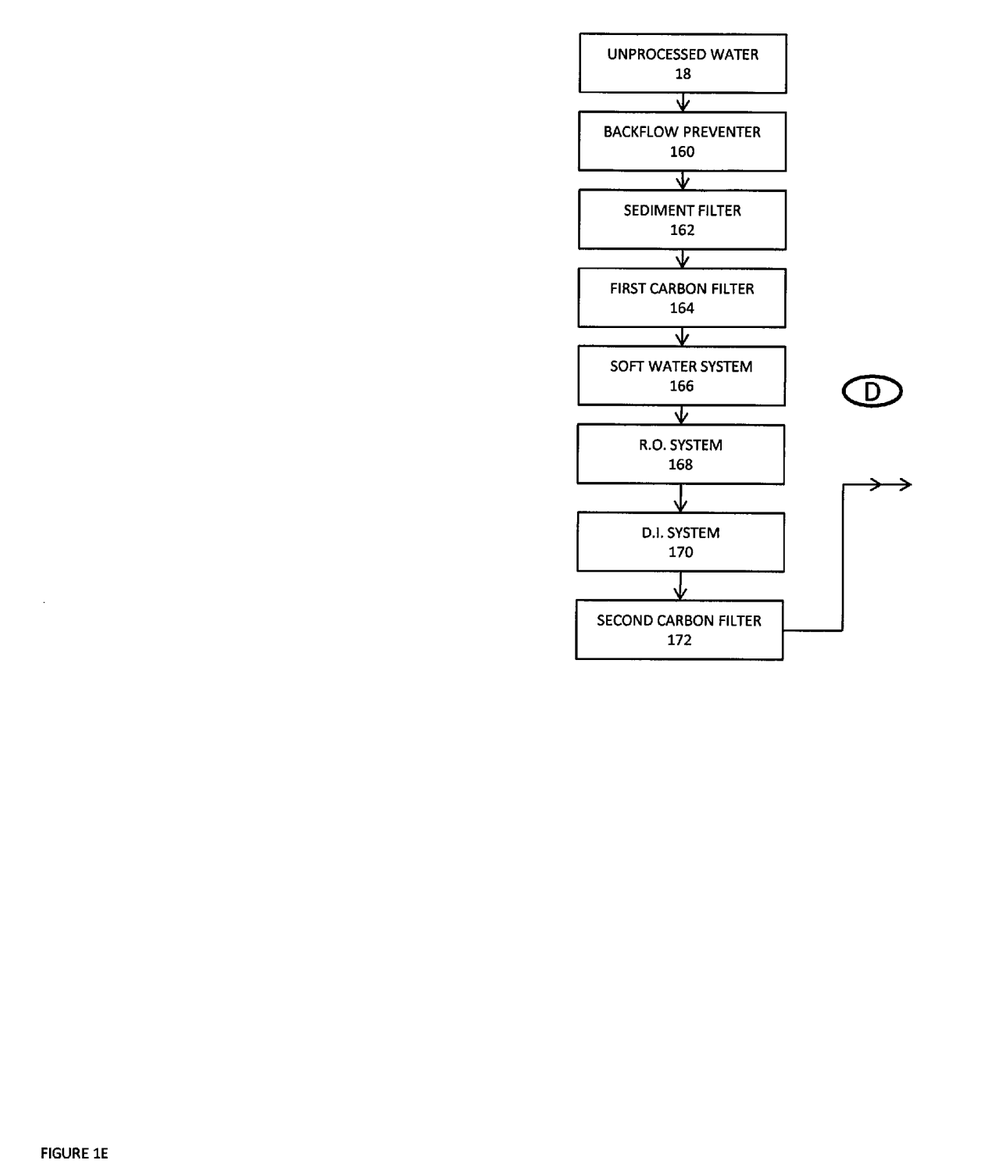
FIG. 1E is that portion of the entire flow chart located immediately to the left of FIG. 1A.

As shown in FIG. 1D, in order to finish the extract, juice in standardizing tank 148 is pumped by standardizing tank pump 150 (a positive displacement pump) through in-line strainer 152, magnet 154, and metal detector 156 to drums 158. Magnet 154 removes ferrous materials and metal detector 156 removes any large non-magnetic materials, such as non-magnetic stainless steel.

The present invention also includes an extract made according to any of the aforementioned methods. This extract may have a brix of from about 20 to about 40 or, more specifically, the extract may have a brix of about 40.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for making a fruit or vegetable extract having polyphenols from a fruit or vegetable pomace wherein the fruit or vegetable extract is chosen from the group consisting of: a cranberry extract, a blueberry extract, a grape extract, a blackberry extract, a black currant extract, a tomato extract, a carrot extract, and a beet extract having a phenolics content of at least 3960 mg/100 g of extract comprising the steps of:
    providing a phenolic containing fruit or vegetable pomace chosen from the group consisting of: a cranberry pomace, a blueberry pomace, a grape pomace, a blackberry pomace, a black currant pomace, a tomato pomace, a carrot pomace, and a beet pomace;
    diffusing the pomace in water to form a hydrated pomace;
    heating the hydrated pomace to a temperature of from about 100° F. to about 130° F. before the hydrated pomace is screened;
    screening the hydrated pomace using a flat drag screen by moving the hydrated pomace across the flat drag screen using brushes whereby a free-run juice and a screened pomace are separated from the hydrated pomace;
    pressing the screened pomace using a press whereby a pressed juice and a primary pressed pomace are separated from the screened pomace;
    wherein the temperature of the hydrated pomace does not drop more than five degrees as the hydrated pomace is screened to form the screened pomace and pressed to form the primary pressed pomace;
    combining the free-run juice and the pressed juice into a combined pressed juice;
    spinning the combined pressed juice whereby a clarified juice and a sediment are separated from the combined pressed juice;
    filtering the clarified juice to form a filtered juice; and
    concentrating the filtered juice to form the extract chosen from the group consisting of: a cranberry extract, a blueberry extract, a grape extract, a blackberry extract, a black currant extract, a tomato extract, a carrot extract, and a beet extract.

2. The method of claim 1, wherein the pressing step includes a primary pressing and a secondary pressing, and the pressed juice and the primary pressed pomace are separated from the screened pomace during the primary pressing, the method further comprising hydrating the primary pressed pomace with an aqueous solution between the primary pressing and the secondary pressing steps to form a hydrated pressed pomace.

3. The method of claim 2 whereby a re-washed juice and a waste pomace are separated from the hydrated pressed pomace during the secondary pressing.

4. The method of claim 3 further comprising the step of adding the re-washed juice to the combined pressed juice and the step of screening the hydrated pomace includes dragging screened pomace off the flat drag screen and dumping the screened pomace into the press.

5. The method of claim 2 further comprising hydrating the sediment and combining the sediment with the hydrated pressed pomace and wherein gravity is used throughout the screening and pressing steps to move the screened pomace to a primary press where the step of pressing the screened pomace is performed to move the primary pressed pomace.

6. The method of claim 1, wherein the diffusing step includes heating and agitating the pomace and wherein the step of screening the hydrated pomace comprises dragging the hydrated pomace across a horizontal drag screen using brushes to liberate the free-run juice from the hydrated pomace.

7. The method of claim 1, wherein the spinning step includes decanting the combined pressed juice to form a decanted juice and centrifuging the decanted juice.

8. The method of claim 1, wherein the filtering step includes filtering by passing the clarified juice.

9. The method of claim 2, wherein a reclaimed concentrator condensate is formed from the concentrating step.

10. The method of claim 6, wherein the extract has a brix of from about 20 to about 40 and wherein the steps of screening the hydrated pomace and pressing the screened pomace utilize gravity to facilitate movement of the screened pomace and the primary pressed pomace and wherein no pumping action is used to move the screened pomace and the pressed pomace.

11. The method of claim 10, wherein the extract has a brix of about 40 and the fruit or vegetable extract has an Oxygen Radical Absorbance Capacity of at least 880 Trolox equivalent per gram.

12. The method of claim 9, wherein the aqueous solution includes at least some of the reclaimed concentrator condensate.

13. The method of claim 1, wherein the water comprises water chosen from the group consisting of deionized water and municipal water and wherein the method further comprises the step of removing ferrous materials from the filtered clarified juice.

14. The method of claim 1, wherein the fruit or vegetable pomace is a berry pomace.

15. The method of claim 14, wherein the berry pomace is blueberry pomace.

16. An extract made according to the method of claim 1.

17. The extract of claim 16 having a brix of from about 20 to about 40.

18. The method of claim 1 further comprising the steps of separating the hydrated pomace into a first line and a second line and wherein steps of screening and pressing are performed by a first screening and pressing line that screens and processes hydrated pomace along the first line and a second screening and pressing line that screens and presses hydrated pomace along the second line.

19. The method of claim 1, wherein the step of filtering the clarified juice to form a filtered juice comprises the step of passing the clarified juice through a first diatomaceous earth filter and a second diatomaceous earth filter and wherein the filtered juice has less than 200 nephelometric turbidity units.

20. The method of claim 6, wherein the extract is chosen from the group consisting of: a cranberry extract, a blueberry extract, a grape extract, a blackberry extract, a black currant extract, a tomato extract, a carrot extract, and a beet extract has an Oxygen Radical Absorbance Capacity of at least 880 Trolox equivalent per gram and wherein gravity is used throughout the screening and pressing steps to move the screened pomace to a primary press where the step of pressing the screened pomace is performed to move the primary pressed pomace.

* * * * *

UNITED STATES PATENT AND TRADEMARK OFFICE
CERTIFICATE OF CORRECTION

| | |
|---|---|
| PATENT NO. | : 8,563,073 B1 |
| APPLICATION NO. | : 12/128462 |
| DATED | : October 22, 2013 |
| INVENTOR(S) | : David Luther et al. |

It is certified that error appears in the above-identified patent and that said Letters Patent is hereby corrected as shown below:

In the Specifications

Column 1, line 55, insert --With the present method, the screening and pressing steps may include a first screening and pressing line and a second screening and pressing line (see Fig. 1A). Also, a reclaimed concentrator condensate may be formed from the concentrating step and the aqueous solution may include some of the reclaimed concentrator condensate (RCC).--

Column 2, line 66, delete "With the present method, the screening and pressing steps may include a first screening and pressing line and a second screening and pressing line (see Fig. 1A). Also, a reclaimed concentrator condensate may be formed from the concentrating step and the aqueous solution may include some of the reclaimed concentrator condensate (RCC)."

Column 4, lines 42-60, insert --Through a combination of steps, the inventors have devised a method for efficiency removing extract from a fruit or vegetable pomace. The present process generally involves providing a fruit or vegetable pomace, diffusing the pomace in an aqueous solution to form a hydrated pomace, screening the hydrated pomace whereby a free-run juice and a screened pomace are separated from the hydrated pomace; pressing the screened pomace whereby a pressed juice and a primary pressed pomace are separated from the screened pomace; combining free-run juice and the pressed juice into a combined pressed juice; spinning the combined pressed juice whereby a clarified juice and a sediment are separated from the combined pressed juice; filtering the clarified juice to form a filtered juice; and concentrating the filtered juice to form an extract. FIGS 1A through 1E depict one embodiment of extraction system 10. In one embodiment, all of the tubes or lines carrying product in extraction system 10 are made from stainless steel. Typically, the stainless steel lines are three inches long.--

Column 4, lines 42-60, delete "Through a combination of steps, the inventors have devised a method Signed and Sealed this
Eleventh Day of March, 2014

Michelle K. Lee
*Deputy Director of the United States Patent and Trademark Office* for efficiency removing extract from a fruit or vegetable pomace. The present process generally involves providing a fruit or vegetable pomace, diffusing the pomace in an aqueous solution to form a hydrated pomace, screening the hydrated pomace whereby a free-run juice and a screened pomace are separated from the hydrated pomace; pressing the screened pomace whereby a pressed juice and a primary pressed pomace are separated from the screened pomace; combining the free-run juice and the pressed juice into a combined pressed juice; spinning the combined pressed juice whereby a clarified juice and a sediment are separated from the combined pressed juice; filtering the clarified juice to form a filtered juice; and concentrating the filtered juice to form an extract. FIGS 1A through 1E depict one embodiment of extraction system 10. In one embodiment, all of the tubes or lines carrying product in extraction system 10 are made from stainless steel. Typically, the stainless steel lines are three inches lines."